United States Patent [19]
Nishizawa

[11] 3,799,344
[45] Mar. 26, 1974

[54] PURE WATER SUPPLY DEVICE

[76] Inventor: Hideyuki Nishizawa, No. 68, Nakazato-cho, Kita-ku, Tokyo-to, Japan

[22] Filed: May 26, 1972

[21] Appl. No.: 257,318

[30] Foreign Application Priority Data
May 31, 1971 Japan.............................. 46-45006

[52] U.S. Cl.................. 210/96, 210/104, 210/125, 210/128, 210/257
[51] Int. Cl............................................. B01d 15/04
[58] Field of Search........ 210/93, 96, 125, 128, 257

[56] References Cited
UNITED STATES PATENTS

| | | | |
|---|---|---|---|
| 3,477,576 | 11/1969 | Luck et al............................. | 210/96 |
| 1,825,631 | 9/1931 | Horvath.......................... | 210/125 X |
| 1,911,412 | 5/1933 | Wagner................................. | 210/96 |
| 3,245,537 | 4/1966 | Burgess............................ | 210/96 X |

*Primary Examiner*—John Adee

[57] ABSTRACT

A compact pure water supply device automatically retains a constant predetermined level in the storage tank and renders a visual indication of the requirement for ion regeneration by means of a transistorized control circuit.

1 Claim, 3 Drawing Figures

PURE WATER SUPPLY DEVICE

The conventional pure water supply device is constructed in such a way that a valve is provided in a feed water pipe that communicates with the ion exchanger. The volume of untreated water to the pure water storage tank is adjusted by the manual operation of the valve, but since the operation is manual, the possibility of staining around the pure water tank is involved as the pure water frequently overflows.

Also, when the ion exchanger loses its ability to purify the water by the mere passage of a large volume of water it becomes necessary to replace it or regenerate it at frequent intervals. Also in the conventional device, there is no automatic mechanism involved and therefore water that has not been substantially subjected to the pure water processing is frequently supplied to the pure water tank.

Accordingly, an object of the present invention is to provide a pure water supply device in which pure water of a predetermined volume is automatically supplied to maintain a constant level in the pure water tank. Further, there is provided the feature that when the ability of the ion exchanging type pure water device is decreasing, such non-pure water is not permitted to flow into the tank, and thus water having purity above a predetermined purity is only supplied into the tank.

Another object of the present invention is to provide a pure water supply device wherein with the decreasing ability of obtaining the pure water, the reduction is indicated or the requirement of regeneration or exchange of the ion exchange device is indicated.

A still further object of the present invention is to provide an integrated pure water supply device which can be constructed merely by connecting an untreated water supply source, ion exchange type pure water producing device and a drain pipe and the like by means of pipe couplings.

Figure 1:
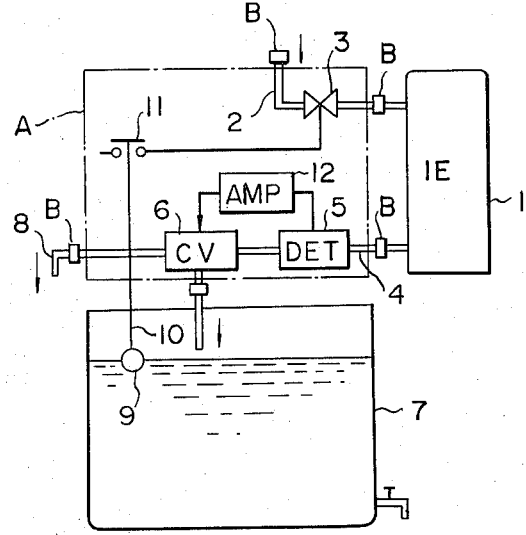
FIG. 1 is a schematic diagram of a preferred embodiment of a pure water supply device according to the present invention.

In FIG. 1, an electromagnetic valve 3 is interposed in a feed pipe 2 that supplies untreated water and that operatively connects with an ion exchange type pure water producing device 1. In a piping 4 at the outlet side of the pure water producing device 1, a conductivity detector 5 for measuring the purity of the water passing therethrough and a flow passage change-over mechanism including a three-way cock 6 are respectively incorporated and serially connected therein. One of the two outlets of this flow passage change-over mechanism 6 opens to the inside of a pure water tank 7, and the other outlet is connected to an outlet drain pipe 8. Reference numeral 9 shows a float that moves vertically according to the water level in the pure water tank 7, and its movement is conveyed to a float switch 11 by means of a connecting rod 10. The float switch 11 is operatively connected to an electric circuit to be described hereinafter. When the float switch 11 is closed, the electromagnetic valve 3 opens, and the feeding of water to the pure water producing device 1 is effected to begin and thence the pure water is supplied to the pure water tank 7. When the level of the water stored in tha tank exceeds a predetermined level, the float switch 11 opens and the electromagnet valve 3 closes to stop the flow of water.

The conductivity detector 5 is also electrically connected to an amplifier 12 to be described hereinafter. When the conductivity of the water passing therethrough exceeds a predetermined value, the flow passage changeover mechanism 6 is electrically switched by a signal from the amplifier 12, and the water passing therethrough flows to the drain pipe 8 in lieu of the pure water tank 7.

Figure 2:
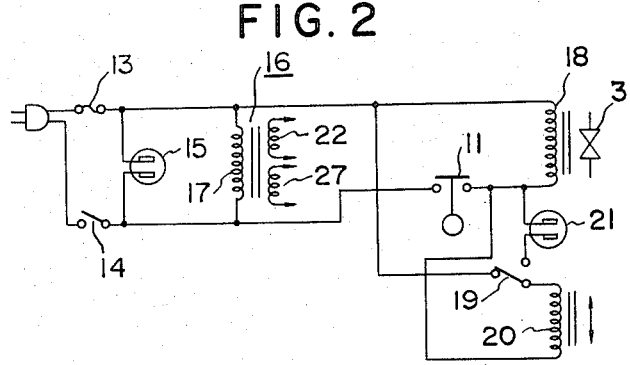
FIG. 2 is a circuit diagram of the control circuit.
Figure 3:
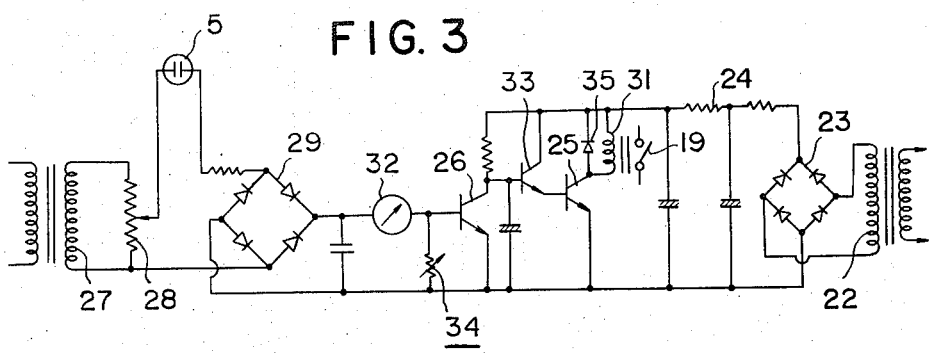
FIG. 3 is detailed circuitry of the control circuit of FIG. 2 including the circuit.

An embodiment of the electric circuit including amplifier 12 is shown in FIG. 2 and FIG. 3. Namely in FIG. 2, a pilot lamp 15 and a primary winding 17 of a transformer 16 are connected to a power source plug by means of a fuse 13 and a main switch 14. A excitation coil 18 of the electromagnetic valve 3 is connected by means of the float switch 11, and furthermore, an excitation coil 20 of the flow passage changeover mechanism 6 is connected by means of a changeover switch 19. Between one pole of the changeover switch 19 and a load side terminal of the float switch 11, a neon lamp 21 is therein connected.

As illustrated in FIG. 3, a secondary winding 22 of the transformer 16 is adapted to operatively supply an electric power to transistors 25, 26, and 33 through a bridge rectifier 23 and a smoothing resistance circuit 24. The other secondary winding 27 of the transformer 16 is connected to a variable resistor 28. An output of this variable resistor is caused to pass through a voltmeter 32 as a direct current by means of the serial connected purity detector 5 and a bridge rectifier 29. The voltmeter 32 is connected to a base and an emitter of the transistor 26. The variable resistor 34 disposed between a base and an emitter of the transistor 26 is adapted to bypass this current and has a function of changing an operating point of the transistor. This output voltage is amplified by the transistors 33 and 25 coupled in Darlington connection. The emitter of the transistor 25 (at third stage) is inserted with a relay coil 31, and when the conductivity in the purity detector 5 exceeds a predetermined value, the changeover switch 19 is effected, and the flow passage changeover mechanism 6 is switched over to the drain side. At this time, the neon lamp 21 is lighted to indicate the deterioration of the ion exchanging ability of the ion exchanger 1. A diode 35 connected to by pass relay coil 31 is for the purpose of protecting transistor 25 from an excessive current when the relay 31 is set to off. It is to be noted that voltmeter 32 displays the conductivity of the purity detector 5.

As explained in the foregoing, in the device of the present invention, the electromagnetic valve 3 for incoming feed water is caused to open and close automatically according to the level of the stored water in the pure water tank 7. At the same time, when either the ability of the ion exchanger is deteriorating or impurity water is flowing immediately after the replacement of the ion exchanger, the non-pure water is automatically drained through pipe 8 and thus is designed to prevent the flowing of such water into the pure water tank. Also, with the lighting of the neon lamp 21, a visual indication is made that the exchange or regeneration of the ion exchanger 1 should be accomplished. Furthermore, by the change of the operating point of the transistor 26, the specific resistivity of the pure water to be supplied to the tank can be arbitrarily set whereby the purity water having the predetermined purity can be used.

The control mechanism which is a substantially compact unit in this invention is illustrated with a chained line frame A in FIG. 1. Further, attention is directed to the detachable coupling arrangement of the piping; which connects various parts including the ion exchanger 1, pure water tank 7 drain pipe 8. Symbol B denotes pipe couplings for such purpose.

What is claimed is:

1. A compact pure water supply device comprising in combination:
    a source of untreated water;
    an electromagnetic valve member connected by a first piping means to said water source and adapted to operate to define open and closed positions;
    an ion exchanger tank means connected by a second piping means to said valve member;
    a detector means connected by a third piping means to said ion exchanger tank means and adapted to measure the conductivity of the water in said third piping means;
    a valve means connected by a fourth piping means to said detector means and having two outlets, one of said two outlets connected by a fifth piping means to an outlet drain means;
    a pure water tank having a float valve operatively mounted therein, the other of said two outlets connected by a sixth piping means to said pure water tank;
    a first electrical means operatively connecting said electromagnetic valve member to said float valve via a float switch, said electromagnetic valve member adapted to be selectively operative to either the open or closed position according to a predetermined level of water in said pure water tank; and
    a second electrical means operatively connecting said detector means to said valve means via an amplifier means for selectively connecting said valve means to said outlet drain means or to said pure water tank.

* * * * *